Patented Sept. 20, 1927.

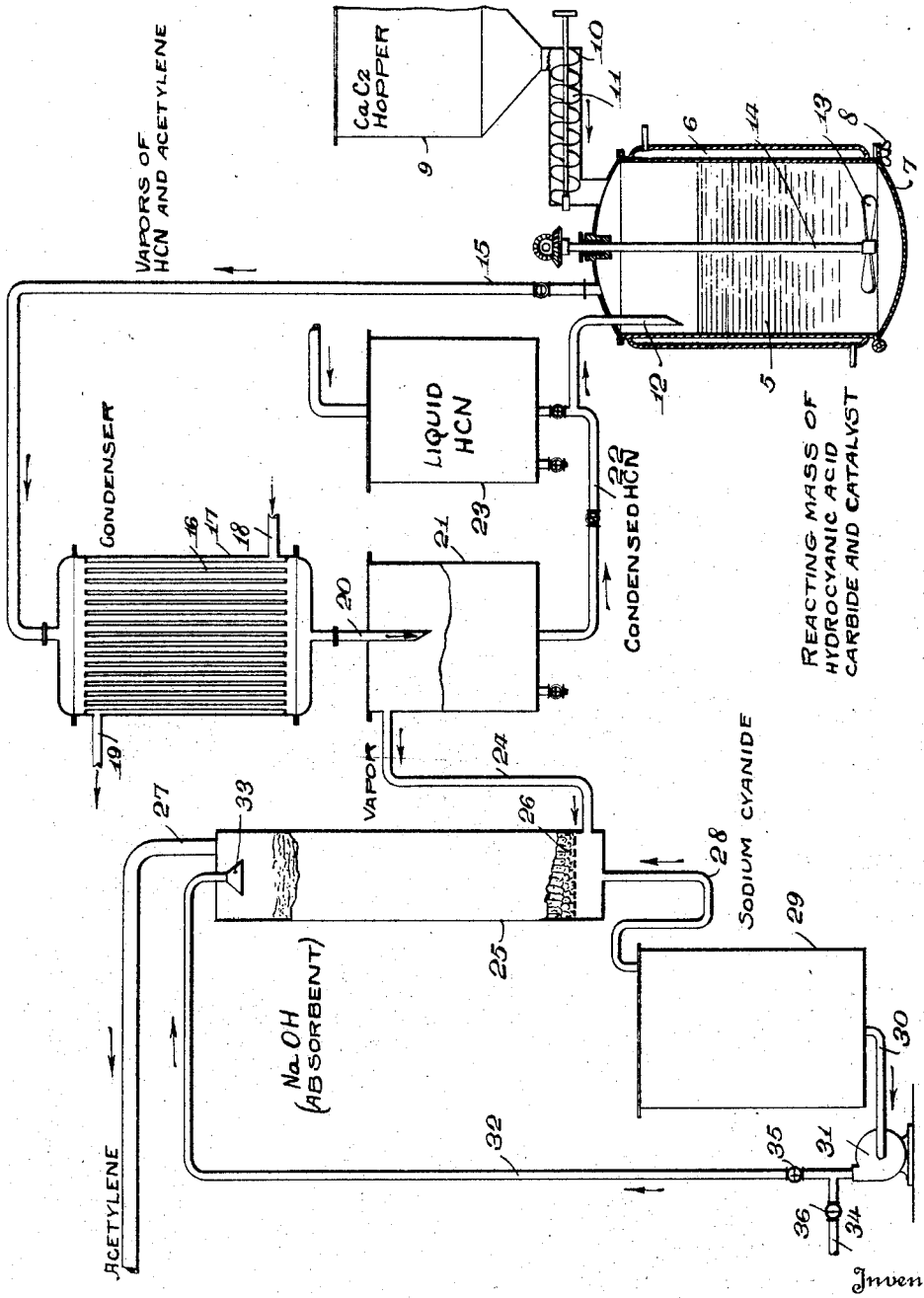

1,642,694

UNITED STATES PATENT OFFICE.

ROBERT W. POINDEXTER, JR., OF LOS ANGELES, AND WILLIAM EARL OLBERG, OF LONG BEACH, CALIFORNIA, ASSIGNORS TO CALIFORNIA CYANIDE COMPANY, INCORPORATED, OF NEW YORK, N. Y., A CORPORATION OF DELAWARE.

PREPARATION OF CYANOGEN COMPOUNDS.

Application filed August 19, 1926. Serial No. 130,360.

This invention relates to the production of cyanides, and particularly to an improved process for the production of cyanide of calcium.

In United States Letters Patent No. 1,573,732, Metzger has described a process of producing cyanides such as calcium cyanide in a dry and concentrated form. This process depends upon a reaction between calcium carbide and hydrocyanic acid proceeding as follows:

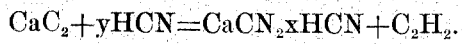

$$CaC_2 + yHCN = CaCN_2 \cdot xHCN + C_2H_2.$$

The product contains a variable proportion of hydrocyanic acid of combination but so far as has been determined there are usually two molecules of hydrocyanic acid combined with the calcium cyanide.

According to Metzger the reaction proceeds slowly in the absence of water and it is desirable, therefore, to add from one-half of one per cent to five per cent of water or to provide otherwise for the presence of water during the reaction. The water acts apparently as a catalyst and only a small amount is required to ensure that the reaction will proceed with comparative rapidity. The water can be introduced with the hydrocyanic acid or otherwise. Thus, a bone dry calcium cyanide should be treated preferably with hydrocyanic acid containing from one-half to five per cent of water calculated on the weight of carbide employed. The presence of a surplus of water in the reaction as described is undesirable owing to the tendency of the water to cause partial polymerization.

It is the object of the present invention to avoid the necessity for adding water in conducting the reaction between calcium carbide and hydrocyanic acid and to provide a process capable of producing improved yields of the desired product and to otherwise simplify the operation.

Other objects and advantages of the invention will be apparent as it is better understood by reference to the following specification and accompanying drawing in which an apparatus for use in carrying out the invention is illustrated diagrammatically.

We have discovered that the reaction between calcium carbide and hydrocyanic acid can be catalyzed or otherwise accelerated by the addition of substances which may be referred to as "promoters" to the mixture during the reaction. Various substances act as promoters of the reaction and among them we find that the following are best adapted to the accomplishment of the desired object: Ammonium bromide, calcium bromide, ammonium thiocyanate, zinc bromide, ammonium iodide, zinc chloride and benzoic acid. The capacity of the several substances mentioned to promote the reaction varies and the proportion thereof required in conducting the reaction is subject likewise to variation. As examples of the proportions which may be desirable we find that from two to eight per cent of ammonium bromide or from one and one-half to five per cent of ammonium thiocyanate will ensure the rapid and effective reaction between calcium carbide and hydrocyanic acid. We have also discovered that mixtures of the promoters mentioned may also be used with advantage, for example, a mixture containing from two to five per cent of ammonium bromide and from one-half to two per cent of ammonium thiocyanate. The percentages mentioned are based upon the weight of the carbide employed.

If the calcium carbide is free from contaminating constituents substantially pure calcium cyanide can be produced. Since, however, calcium carbide of a commercial grade is rarely pure, calcium cyanide produced therefrom will contain certain impurities. It is possible, nevertheless, to produce a very high grade of calcium cyanide from good commercial calcium carbide. Such a carbide contains approximately 80% of calcium carbide and it can be made to yield a product containing cyanogen equivalent to one hundred or more per cent of calcium cyanide.

In carrying out the reaction it is desirable to employ calcium carbide in a finely divided state. We have found that carbide of from forty to one hundred mesh or even finer is suitable for the reaction. It is not essential however, that the calcium carbide be introduced in a pulverized condition. Carbide in lump form can be used provided that it is stirred sufficiently during the reaction to expose fresh surfaces continuously to the action of the hydrocyanic acid. The resultant abrasion will remove the calcium cyanide from the lumps and thus permit the continued attack of the hydrocyanic acid upon the carbide.

The preferred apparatus comprises a reaction vessel having suitable means to permit cooling or heating as desired. The vessel which should be closed may have inlets to permit the introduction of the calcium carbide and liquid hydrocyanic acid and should be provided with stirring means to maintain suitable agitation of the material during the reaction. Owing to the fact that one of the reaction products is gaseous acetylene it is necessary to have an outlet for the gas. A certain amount of hydrocyanic acid as vapor will be carried off by the gas and this may be condensed and returned to the reaction vessel. The acetylene should be scrubbed to remove any hydrocyanic acid which is not condensed. It can be used thereafter for any of the usual purposes for which acetylene is employed.

The reaction can be carried out likewise in a closed apparatus similar to a dough mixer in which the calcium carbide is placed and into which the liquid hydrocyanic acid is supplied at a rate just sufficient to permit reaction with the carbide. In this case the material would be substantially dry during the entire operation and the necessity for drying the product would be avoided. Similarly the operation could be conducted in an apparatus adapted to supply fresh carbide continuously and to apply hydrocyanic acid thereto on the counter-current principle, so that the partially completed product would be caused to react with a fresh supply of liquid hydrocyanic acid while the fresh calcium carbide would combine with that portion of the hydrocyanic acid which escapes reaction with the substantially completed product. Various other types of apparatus can be utilized. By conducting the reaction as described it is possible to produce large quantities of calcium cyanide in various degrees of purity, depending upon the quality of the calcium carbide used.

Referring to the drawing in which the preferred apparatus is illustrated, 5 indicates a reaction vessel having a jacket 6 through which heating and cooling agents can be circulated as desired. The vessel is provided preferably with a hinged bottom 7 which is normally secured in closed position by hinged clamp bolts 8. The bottom can be dropped readily to discharge the contents of the vessel.

A hopper 9 is adapted to contain a supply of calcium carbide and is connected to the vessel 5 by a conveyor 10 having a screw 11 therein. A pipe 12 permits the introduction of liquid hydrocyanic acid. The mass of carbide and hydrocyanic acid is agitated by means of a stirrer 13 secured to a shaft 14 which extends through the top of the vessel and is adapted to be driven from any suitable source of power.

The gaseous product of the reaction is withdrawn thru a pipe 15 and is delivered to tubes 16 of a condenser 17, these tubes being surrounded preferably by a cooling medium such as brine which is introduced through an inlet 18 and withdrawn through an outlet 19. The gaseous product with the condensed hydrocyanic acid is delivered by a pipe 20 to a receiver 21 where any liquid hydrocyanic acid separates and from which it is delivered through a pipe 22 to a supply receptacle 23 from which the liquid hydrocyanic acid passes through the pipe 12 into the reaction vessel.

The gas escaping from the receiver 21 passes through a pipe 24 to a column 25 and upwardly therein through a mass of inert material 26 over which the dilute solution of caustic soda flows continuously. The caustic soda absorbs any hydrocyanic acid remaining in the acetylene which escapes through an outlet pipe 27 and may be conveyed to any suitable storage receptacle. The caustic soda is delivered from the tower through a pipe 28 forming a seal into a receiver 29 in which a suitable supply of the solution is maintained. From the receiver the solution passes through a pipe 30 to a pump 31 which returns it through a pipe 32 to a spray 33 at the top of the tower. A waste pipe 34 is connected to the pipe 32 and valves 35 and 36 are provided to permit the discharge of the caustic soda solution when it is sufficiently saturated with hydrocyanic acid. This solution can be evaporated to recover the sodium cyanide which is formed therein.

The following example will serve to illustrate further the nature of the invention which, however, is not confined to this example. 10 pounds of ammonium bromide were placed in the reaction vessel with 750 pounds of redistilled hydrocyanic acid. Agitation of the mixture was started and 200 pounds of ground calcium carbide were introduced slowly. During the addition of the carbide the mass was agitated continuously and cold water was conducted through the jacket of the reaction apparatus. The reaction commenced immediately upon the addition of the carbide with considerable violence but it was controlled by adjustment of the rate of which the carbide was added and by the circulation of the cooling water in the jacket. Acetylene was given off freely and this acetylene, which carried a considerable amount of hydrocyanic acid vapor, was passed through the condenser and cooled therein to condense the hydrocyanic acid vapors and to separate the liquid thereby produced from the acetylene. When the reaction was substantially complete as indicated by the fact that acetylene gas ceased to be evolved, warm water at approximately 60° C. was substituted for the cold water in the jacket. The circulation of warm water was continued until free hydrocyanic acid was vaporized and removed and the product was then cooled and discharged.

The product thereby obtained was nearly white, very finely divided and showed by analysis a cyanogen content of 58.1 per cent. The yield was 93.8 per cent of the theoretical amount based upon the quantity of hydrocyanic acid employed.

The product dissolves quickly and completely in water except for such normal insoluble impurities as occur in the carbide employed. It is very susceptible to the action of the atmosphere, giving off hydrocyanic acid rapidly and copiously and leaving a powdery residue usually somewhat darker in color than the original material.

While the process as described is designed primarily to avoid the necessity of including water in the reaction between calcium carbide and hydrocyanic acid in order to promote the reaction, it is to be understood that strictly anhydrous hydrocyanic acid is not essential to the operation as described herein. Redistilled liquid hydrocyanic acid usually contains upward to about one-half of one per cent of water and this proportion of water is not detrimental to the reaction. The promoters as herein described replace the additional quantity of water which has been added or otherwise supplied heretofore for the purpose of accelerating the reaction between calcium carbide and hydrocyanic acid.

It is to be noted that the promoters such as ammonium bromide and the like, above mentioned, remain with and therefore become a constituent part of the finished product, calcium cyanide. Although the promoter constitutes but a small part (from 1 to 5%) of the finished product, we have found that its presence in the product has a beneficial effect in the following way. When calcium cyanide is exposed to the air in relatively thick layers for the purpose of liberating hydrocyanic acid therefrom, there is a tendency toward polymerization of a part of the hydrocyanic acid which thereby becomes ineffective. When, however, calcium cyanide, containing promoters such as ammonium bromide and the like is similarly exposed to the air, there is a marked decreased tendency toward polymerization. It is possible that this effect may be due to some extent at least to the absence of water as it is substantially eliminated from the reaction by the use of the described promoters. These promoters may therefore be regarded as having a beneficial effect on the product in that they act as stabilizers and decrease the tendency toward polymerization of the liberated hydrocyanic acid, and thereby constitute a valuable constituent of the product.

Among the advantages of the invention as described are the reduction in the time required to complete the reaction, a substantially complete elimination of polymerized hydrocyanic acid in the finished product, increased efficiency with respect to the amount of hydrocyanic acid required, increased cyanogen content in the product, and a product of considerably lighter color and increased effectiveness than has been produced by the reaction heretofore.

The invention comprehends the production of cyanogen compounds of other metals, the carbides of which may react with hydrocyanic acid to produce such compounds.

As herein indicated, various types of apparatus may be used in conducting the reaction and the details of the operation may be modified without departing from the invention or sacrificing any of the advantages thereof.

We claim:—

1. The process of preparing cyanogen compounds of the alkali-forming metals, which comprises treating their carbides with hydrocyanic acid in the presence of ammonium bromide.

2. The process of preparing a cyanogen compound of calcium, which comprises treating calcium carbide with hydrocyanic acid in the presence of ammonium bromide.

3. The method of preparing a cyanogen compound of the alkali-forming metals, which comprises treating their carbides with anhydrous hydrocyanic acid, and with a relatively small proportion of a promoter free from water and water-forming components.

4. The method of preparing a cyanogen compound of the alkali-forming metals, which comprises treating their carbides with anhydrous hydrocyanic acid, in the presence of a catalyst from the group comprising $NH_4Br$, $NH_4CNS$, $CaBr_2$, $NH_4I$, $ZnCl_2$, $ZnBr_2$, $C_6H_5COOH$.

5. The method of preparing a cyanogen compound of the alkali-forming metals, which comprises treating their carbides with anhydrous hydrocyanic acid, in the presence of an $NH_4R$ compound where R is from the group comprising bromine, iodine and the thio-cyanate radical.

6. As an article of manufacture, a composition of matter which contains calcium cyanide and a compound from the group comprising $NH_4Br$, $NH_4CNS$, $CaBr_2$, $NH_4I$, $ZnCl_2$, $ZnBr_2$, $C_6H_5COOH$.

7. As an article of manufacture, a composition of matter which contains calcium cyanide and an $NH_4R$ compound where R is from the group comprising bromine, iodine, and the thio-cyanate radical.

8. As an article of manufacture, a composition of matter which contains calcium cyanide and ammonium bromide.

In testimony whereof we affix our signatures.

ROBERT W. POINDEXTER, Jr.
WILLIAM EARL OLBERG.